United States Patent
Piemonte et al.

(10) Patent No.: US 11,935,197 B2
(45) Date of Patent: *Mar. 19, 2024

(54) ADAPTIVE VEHICLE AUGMENTED REALITY DISPLAY USING STEREOGRAPHIC IMAGERY

(71) Applicant: Apple Inc., Cupertino, CA (US)

(72) Inventors: Patrick S. Piemonte, San Francisco, CA (US); Daniel De Rocha Rosario, San Francisco, CA (US); Jason D Gosnell, San Jose, CA (US); Peter Meier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/175,456

(22) Filed: Feb. 12, 2021

(65) Prior Publication Data
US 2021/0166490 A1 Jun. 3, 2021

Related U.S. Application Data

(63) Continuation of application No. 15/713,274, filed on Sep. 22, 2017, now Pat. No. 10,922,886.
(Continued)

(51) Int. Cl.
*G06T 19/00* (2011.01)
*G01C 21/26* (2006.01)
(Continued)

(52) U.S. Cl.
CPC ............ *G06T 19/006* (2013.01); *G01C 21/26* (2013.01); *G01C 21/365* (2013.01);
(Continued)

(58) Field of Classification Search
CPC .................. G06T 17/20; G06T 19/006; G06T 2207/10028; G06T 17/00; G06T 19/20;
(Continued)

(56) References Cited

U.S. PATENT DOCUMENTS 8,892,358 B2   11/2014   Bosch
2009/0128449 A1   5/2009   Brown et al.
(Continued)

FOREIGN PATENT DOCUMENTS

EP        2731082        5/2014
WO     2010004466        1/2010
(Continued)

OTHER PUBLICATIONS

International Search Report and the Written Opinion from PCT/US2017/053096, dated Jan. 26, 2018, Apple Inc., 24 pages.
Invitation to Pay Additional Fees from PCT/US2017/053096, dated Dec. 5, 2017, Apple Inc., pp. 21.
Chinese Office Action from Application No. 201780053115.9, Apple, Inc., dated Nov. 25, 2022, Apple Inc., 10 pages.

*Primary Examiner* — Xiao M Wu
*Assistant Examiner* — Scott E Sonners
(74) *Attorney, Agent, or Firm* — Alexander A. Knapp; Kowert, Hood, Munyon, Rankin & Goetzel, P.C.

(57) ABSTRACT

An AR system that leverages a pre-generated 3D model of the world to improve rendering of 3D graphics content for AR views of a scene, for example an AR view of the world in front of a moving vehicle. By leveraging the pre-generated 3D model, the AR system may use a variety of techniques to enhance the rendering capabilities of the system. The AR system may obtain pre-generated 3D data (e.g., 3D tiles) from a remote source (e.g., cloud-based storage), and may use this pre-generated 3D data (e.g., a combination of 3D mesh, textures, and other geometry information) to augment local data (e.g., a point cloud of data collected by vehicle sensors) to determine much more information about a scene, including information about occluded or distant regions of the scene, than is available from the local data.

20 Claims, 12 Drawing Sheets

Related U.S. Application Data

(60) Provisional application No. 62/398,927, filed on Sep. 23, 2016.

(51) Int. Cl.
*G01C 21/36* (2006.01)
*G02B 27/01* (2006.01)
*G06T 15/20* (2011.01)
*G06T 17/00* (2006.01)
*G06T 19/20* (2011.01)

(52) U.S. Cl.
CPC .......... *G02B 27/017* (2013.01); *G06T 15/205* (2013.01); *G06T 17/00* (2013.01); *G06T 19/20* (2013.01); *G02B 2027/0141* (2013.01); *G05D 2201/0213* (2013.01); *G06T 2210/56* (2013.01)

(58) Field of Classification Search
CPC ..... G06T 17/05; G06T 15/04; G06T 2200/04; G06T 2200/08; G06T 15/205; G06T 19/00; G06T 15/20; G06T 2207/10016; G06T 7/50; G06T 7/593; G06T 7/55; G06T 7/70; G06T 19/003; G06T 15/06; G06T 2200/24; G06T 17/205; G06T 7/75; G06T 7/579; G06T 2215/16; G06T 2207/30196; G06T 7/521; G06T 7/11
See application file for complete search history.

(56) References Cited

U.S. PATENT DOCUMENTS

| | | |
|---|---|---|
| 2009/0293012 A1 | 11/2009 | Alter et al. |
| 2011/0052042 A1 | 3/2011 | Ben Tzvi |
| 2012/0162372 A1 | 6/2012 | Ghyme |
| 2012/0224060 A1* | 9/2012 | Gurevich ................ G06V 20/58 348/148 |
| 2013/0278633 A1 | 10/2013 | Ahn et al. |
| 2014/0132629 A1* | 5/2014 | Pandey ................. G02B 27/017 345/633 |
| 2014/0176535 A1* | 6/2014 | Krig ........................ G06T 19/20 345/419 |
| 2014/0278065 A1* | 9/2014 | Ren .......................... G06T 17/05 701/454 |
| 2015/0206347 A1 | 7/2015 | Russell |
| 2015/0332512 A1* | 11/2015 | Siddiqui ................ G06T 19/006 345/633 |
| 2016/0061622 A1 | 3/2016 | Ren et al. |
| 2016/0267720 A1 | 9/2016 | Mandella et al. |
| 2016/0357014 A1* | 12/2016 | Beckman ........... H04N 5/23287 |
| 2017/0352185 A1* | 12/2017 | Bonilla Acevedo ...... G06F 3/14 |

FOREIGN PATENT DOCUMENTS

| | | |
|---|---|---|
| WO | 2014145722 | 9/2014 |
| WO | 2016137675 | 9/2016 |

* cited by examiner

ADAPTIVE VEHICLE AUGMENTED REALITY DISPLAY USING STEREOGRAPHIC IMAGERY

This application is a continuation of U.S. patent application Ser. No. 15/713,274, filed Sep. 22, 2017, which claims benefit of priority to U.S. Provisional Application No. 62/398,927, filed Sep. 23, 2016, which are hereby incorporated by reference in their entirety.

BACKGROUND

Remote sensing technologies provide different systems with information about the environment external to the system. Diverse technological applications may rely upon remote sensing systems and devices to operate. Moreover, as increasing numbers of systems seek to utilize greater amounts of data to perform different tasks in dynamic environments; remote sensing provides environmental data that may be useful decision-making. For example, control systems that direct the operation of machinery may utilize remote sensing devices to detect objects within a workspace. As another example, augmented reality (AR) systems may utilize remote sensing devices to provide depth information about objects in an environment. In some scenarios, laser based sensing technologies, such as light ranging and detection (LiDAR), can provide high resolution environmental data, such as depth maps, which may indicate the proximity of different objects to the LiDAR.

Real-time augmented reality faces a variety of challenges when it is a primary display technology in a vehicle traveling at various speeds and angles through ever changing environments. Weather conditions, sunlight, and vehicle kinematics, are just a few of the elements that may impact the rendering but that also limit a system's overall capabilities. This is especially true since on-board sensors have a fixed range and often require algorithms for optimizing queries which impact overall quality and response time.

SUMMARY

Methods and systems are described that may, for example, be used in augmented reality (AR) displays in vehicles. Embodiments of an AR system are described that leverage a pre-generated stereographic reconstruction or 3D model of the world to aid in the anchoring and improve rendering of an AR scene. By leveraging the stereographic reconstruction of the world, embodiments of the AR system may use a variety of techniques to enhance the rendering capabilities of the system. In embodiments, an AR system may obtain pre-generated 3D data (e.g., 3D tiles) from a stereographic reconstruction of the world generated using real-world images collected from a large number of sources over time, and may use this pre-generated 3D data (e.g., a combination of 3D mesh, textures, and other geometry information) to determine much more information about a scene than is available from local sources (e.g., a point cloud of data collected by vehicle sensors) which AR rendering can benefit from.

Embodiments of an AR system are described that may use three-dimensional (3D) mesh map data (e.g., 3D tiles reconstructed from aerial/street photography) to augment or complement vehicle sensor (e.g., LiDAR or camera) information on a heads-up display. The 3D tiles can be used to fill in for limitations of the sensors (e.g., areas of the real environment that are occluded by buildings or terrain, or are out of range) to extend the AR into the full real environment in front of the vehicle (i.e., within the driver's field of vision). For example, a route may be displayed, including parts of the route that are occluded by objects or terrain in the real environment.

Embodiments may enable the projection of 3D elements onto the terrain without having to perform altitude queries or reference a point cloud of data collected by on-board sensors. Elements can be rendered in the augmented reality scene beyond the capabilities/range of the onboard sensors. In addition to being blocked by occluding objects in the environment, the sensors are limited by other factors such as distance and the speed of the vehicle. The pre-generated 3D mesh map data can make up for these limitations since the static imagery is made available without having to scan and reference the point cloud.

In some embodiments, the sensor data may be used to provide AR content for the nearby real environment, with the pre-generated 3D mesh map data used to provide AR content for farther away objects and occluded parts of the real environment.

In some embodiments, the pre-generated 3D mesh map data may be used to speed up queries of the point cloud data for nearby objects; it may be possible to make more limited queries based on the 3D mesh map data. Thus, point cloud queries may be optimized for the local region based on the 3D mesh map data for the local region.

In some embodiments, if for some reason the sensor data is not available or is poor/range limited (e.g., sensor failure, dirt on sensor, fog, heavy rain, snow, dark/night (for camera info), inside a tunnel or garage, blocked by other vehicles, etc.), the pre-generated 3D mesh map data may still be available and may be used to fill in the missing local AR content, as well as more remote content.

In some embodiments, normals from visible surfaces in the scene that are provided in the pre-generated 3D data and knowledge of the location of light sources (e.g., the sun) may allow the AR system to determine the orientation of the surfaces with respect to a light source (e.g., the sun). Using this information, when rendering elements into the augmented reality scene, the AR system may adjust the rendering of content in the AR content so that the content is easier to see.

In some embodiments, animated elements (e.g., virtual representations of vehicles, pedestrians, etc.) in the 3D rendered scene may be made to respond to the terrain, as well as the type of surface the terrain is composed of, based on the pre-generated 3D data. For example, if a vehicle in the scene turns and goes behind a building, a virtual image of the vehicle may be displayed as going up a hill that is behind the building and thus out of view of the on-board sensors.

The pre-generated 3D mesh map data may be available for the entire real environment, 360° around the vehicle, behind occlusions, and beyond the horizon. Thus, in some embodiments, the 3D mesh map data may be leveraged to provide information about the environment, including objects that are not visible, to the sides and behind the vehicle.

In some embodiments, the 3D mesh map data may be used by the AR system in poor/limited visibility driving conditions, e.g. heavy fog, snow, curvy mountain roads, etc., in which the sensor range may be limited, for example to project the route in front of the vehicle onto the AR display. For example, the 3D mesh map data may be used to augment sensor data by showing upcoming curves or intersections.

Figure 1:
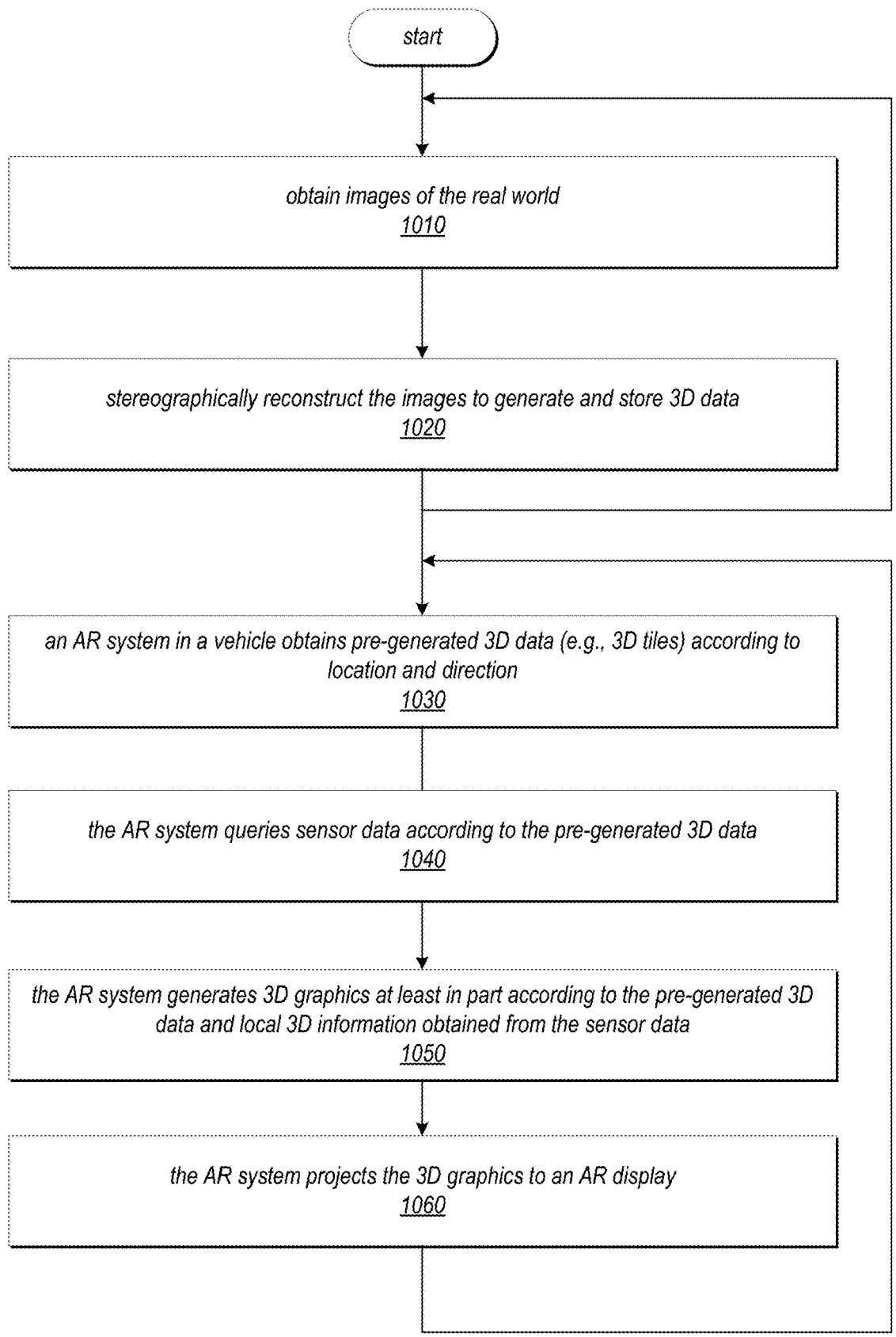
FIG. 1 is a high-level flowchart of a method for augmenting an AR display with stereographically reconstructed 3D data, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Methods and systems are described that may, for example, be used in augmented reality (AR) displays in vehicles. Embodiments of an AR system are described that leverage a pre-generated stereographic reconstruction of the world to aid in the anchoring and improve rendering of an AR scene. By leveraging the stereographic reconstruction of the world, embodiments of the AR system may use a variety of techniques to enhance the rendering capabilities of the system. In embodiments, an AR system may obtain pre-generated 3D data from a stereographic reconstruction of the world generated from real-world images collected from a large number of sources over time, and use this pre-generated 3D data (e.g., a combination of 3D mesh, textures, and other geometry information) to determine much more information about a scene than is available from local sources (e.g., a point cloud of data collected by vehicle sensors) which AR rendering can benefit from. In addition, the pre-generated 3D data may be in a manageable format that can be used by the AR system to map the local environment without having to query into the point cloud of data collected by vehicle sensors at a high rate. The pre-generated 3D data may be used to as a guide to queries of the point cloud so that the queries can be concentrated on and limited to regions for which data is needed. The pre-generated 3D data may unlock AR rendering capabilities and allow AR systems and displays for vehicles to exceed the capabilities of systems that use conventional on-board sensor-dedicated approaches that query large amounts of point cloud data in real-time.

In some embodiments, the pre-generated 3D data, generated from stereographic 3D imagery, provides a mesh reconstruction of the real-world scene in front of and/or around the vehicle or viewer, along with geometry information that may be used to determine surface angles and lighting information, without having to query a point cloud of data collected by local sensors. Knowing the vehicle's location and field of view, the AR system may obtain 3D tiles with the appropriate information for the scene.

By leveraging the pre-generated 3D data, an AR system may render elements in an augmented reality scene beyond the capabilities of the available onboard sensors (e.g., LiDAR, cameras, etc.). LiDAR and other on-board sensors typically have a distance limitation, and may also be limited by other factors such as how fast the vehicle is traveling, motion of the vehicle (e.g., turning or bouncing), occluding objects (buildings, other vehicles, terrain, etc.). The process stereographic imagery can make up for these limitations since the static imagery is available via the pre-generated 3D data without having to query a point cloud of data captured by on-board sensors.

A benefit of using the pre-generated 3D data in an AR system is that it allows the projection of 3D elements onto the terrain without having to perform several altitude queries or reference a large point cloud of data collected by on-board sensors. In addition, the 3D mesh allows the AR system to precisely detect parts of the scene which are occluded, for example a route going behind a building or mountain, and to render virtual content in the scene accordingly.

In addition to the 3D geometry of the terrain, normals from visible surfaces in the scene that are provided in the pre-generated 3D data and knowledge of the location of light sources (e.g., the sun) may allow the AR system to determine the orientation of the surfaces with respect to a light source (e.g., the sun). Using this information, when rendering elements into the augmented reality scene, the AR system may perform color correction of virtual content based on the lighting angle, move virtual content away from surfaces with glare, and/or mitigate sunlight or glares that could be making parts of the rendered AR scene challenging to see.

In some embodiments, animated elements (e.g., virtual representations of vehicles, pedestrians, etc.) in the 3D rendered scene may be made to respond to the terrain, as well as the type of surface the terrain is composed of, based on the pre-generated 3D data. For example, if a vehicle in front of the vehicle with the AR system turns and goes behind a building, a virtual image of the vehicle may be displayed as going up a hill that is behind the building and thus out of view of the vehicle's on-board sensors.

Vehicles, as used herein, may include any type of surface vehicle, for example, automobiles, trucks, motorcycles, ATVs, buses, trains, etc. However, note that the AR systems and methods as described herein may also be adapted for use in airplanes, helicopters, boats, ships, etc. In addition, the AR systems and methods as described herein may be adapted for use in mobile devices such as smartphones, tablet or pad devices, notebook or laptop computers, and AR/VR head-mounted displays (HMDs) such as glasses, goggles, or helmets that may be carried or worn by pedestrians or passengers in a vehicle.

FIG. 1 is a high-level flowchart of a method for augmenting an AR display with stereographically reconstructed 3D data, according to some embodiments. Elements 1010 and 1020 may, for example, be performed by a network-based 3D data system including one or more computing systems that collect images (e.g., aerial and street photography from previous collections, images captured by vehicles equipped with instances of the AR system and/or video or still cameras, images captured by personal devices such as smartphones or tablets, etc.), stereographically reconstruct and otherwise process the images to generate data including 3D mesh maps of surfaces and objects, surface normals, textures, and other geometry information, location information (e.g., GPS coordinates), elevation information, time stamps, and so on. The 3D data may be stored, for example as 3D tiles each representing a 3D portion of the real world and tagged with appropriate information, to a backend storage system, for example cloud-based storage. Frontend server(s) and APIs may be provided for retrieving 3D data from the backend storage.

As indicated at 1010, the 3D data system may obtain images of the real world. As indicated at 1020, the 3D data system may stereographically reconstruct images to generate 3D data (e.g., 3D tiles), and may store the 3D data (e.g., tagged with location information, elevation information, time stamps, etc.) to the storage system (e.g., cloud-based storage). As indicated by the arrow returning from 1020 to 1010, collecting image data and generating 3D data from the collected images may be a continuous process, with new images collected and processed to add to or update the existing 3D data in storage as the images become available.

As indicated at 1030, an AR system in a vehicle may obtain 3D data (e.g., as 3D tiles) according to a current location and direction of travel of the vehicle. For example, the AR system may obtain location information (e.g., GPS coordinates) from a localization system of the vehicle, and may also obtain directional information from the vehicle. The AR system may then query a frontend to the cloud-based storage of 3D data according to the location and directional information, for example via a wireless communications link used to connect the vehicle to the Internet/cloud, to obtain 3D tiles for an area in front of or around the vehicle. 3D tiles may be obtained for the local environment within the range of the vehicle's sensors, as well as for the environment in an extended range outside the range of the sensors. In some embodiments, the AR system may locally store or cache previously fetched 3D tiles, for example for frequently or recently traveled routes, and may thus first check the cache to see if 3D data corresponding to the current location is available in the cache before querying the cloud. In some embodiments, the AR system may fetch 3D tiles in advance based on the vehicle's current location, direction of travel, and velocity. Thus, the AR system may proactively fetch 3D tiles from the cloud-based storage that may be needed in the future while processing previously fetched 3D tiles for the current location and/or upcoming locations.

As indicated at 1040, the AR system may query sensor data according to the fetched, pre-generated 3D data to obtain 3D information for the local environment within the range of the sensors. The vehicle may include sensors (e.g., LiDAR, cameras, etc.) that may generate a large number of data points for the local environment of the vehicle, referred to as a point cloud. The AR system may query this point cloud to obtain and/or generate local 3D information (e.g., locations and geometry (shapes and sizes) of fixed and moving objects, range of the objects, movement/direction of moving objects, etc.). In some embodiments, the pre-generated 3D data may be used to reduce or speed up queries of the point cloud for nearby objects. For example, queries for a region of the local environment may be reduced or not performed at all if pre-generated 3D data is available for the region. In addition, if sensor data is insufficient or missing for a region of the local environment due to occlusion, limitations of the sensors, or environmental conditions such as rain or fog, then if pre-generated 3D data is available for those regions, the obtained 3D data may be used to fill in those regions.

As indicated at 1050, the AR system may generate 3D graphics (also referred to herein as virtual content) at least in part according to the pre-generated 3D data and local 3D information obtained from the sensor data. For example, the virtual content may include route markers for the route that the vehicle is traveling, indications of occluded or partially occluded objects or terrain features (e.g., occluded buildings, occluded roads or portions of the route that the vehicle is traveling on, other vehicles or pedestrians that have gone behind buildings or terrain features, etc.) The virtual content may also include informational tags about objects or features in the environment, for example tags identifying and giving information about visible and/or occluded buildings or terrain features, roads, routes, and so on. The information for the tags may, for example, be acquired from existing 3D map information for the environment available form a mapping/navigation system. The virtual content may also include information about the vehicle such as location information (e.g., GPS coordinates), direction of travel, time of day, speed, and so on. In some embodiments, 3D mesh data obtained from the cloud and/or from local storage may be aligned and combined with 3D mesh data generated from the sensor data to generate a 3D mesh of the environment in front of or around the vehicle. The 3D graphics may then be located in appropriate locations in images being generated by the AR system according to the 3D mesh. In some embodiments, surface normals, texture information, and/or color for objects or surfaces in the environment included in the pre-computed 3D data may be used in combination with lighting information for the environment (e.g., the current location of the sun relative to the vehicle) to relocate, change color and/or intensity of, or otherwise alter at least a portion of the 3D graphics. In some embodiment, colors and/or brightness of regions in the environment may be detected (e.g., blue sky) according to the 3D mesh information and/or information collected from vehicle sensors and used to relocate and/or change color of 3D graphics content. For example, if blue 3D graphics content is to be projected onto a region of blue sky, the color of the content may be changed to provide contrast, or the content may be moved to another region. In some embodiments, terrain geometry information (e.g. slopes of occluded roads) may be used to alter the orientation of animated elements such as graphical representations of vehicles or pedestrians that have gone behind buildings or terrain features so that the animated elements follow the slope of the occluded terrain features.

As indicated at 1060, the AR system projects the 3D graphics to an AR display, for example a portion of the windshield of the vehicle. In some embodiments, the images containing the virtual content may be aligned with the view in front of the vehicle, for example by aligning the images with images captured of the real world by cameras of the vehicle or by aligning the images according to localization and position information collected from localization and position components of the vehicle, and the aligned images may be projected by a projector component of the AR system onto a portion of the windshield to display the 3D graphics content as a "heads up" AR display.

As indicated by the arrow returning from 1060 to 1030, the method may be a continuous process, with pre-generated 3D data and sensor data obtained and processed by the AR system to update 3D graphics content in an AR view of the scene as the vehicle moves through the environment.

While FIG. 1 describes an AR system as projecting virtual content for the view in front of the vehicle onto the windshield of the vehicle as a "heads up display", in some embodiments the AR system may similarly generate 3D graphics content for views in other directions (to the sides, or to the rear) based at least in part on the pre-generated 3D data and vehicle sensor data, and may project the generated content to other surfaces in the vehicle (e.g., side or rear windows of the vehicle) or may provide the generated 3D graphics content to other devices that support AR displays, for example smartphones, laptop or notebook computers, or pad/tablet devices held by passengers, display screens mounted in the vehicle (e.g., behind the front seat or in the dashboard), or head-mounted AR displays (e.g., AR glasses, goggles, helmets, etc.) worn by passengers in the vehicle.

On these other devices, the 3D graphics content provided by the AR system may, for example, be overlaid on camera views of the environment obtained from vehicle-mounted cameras.

Figure 2:
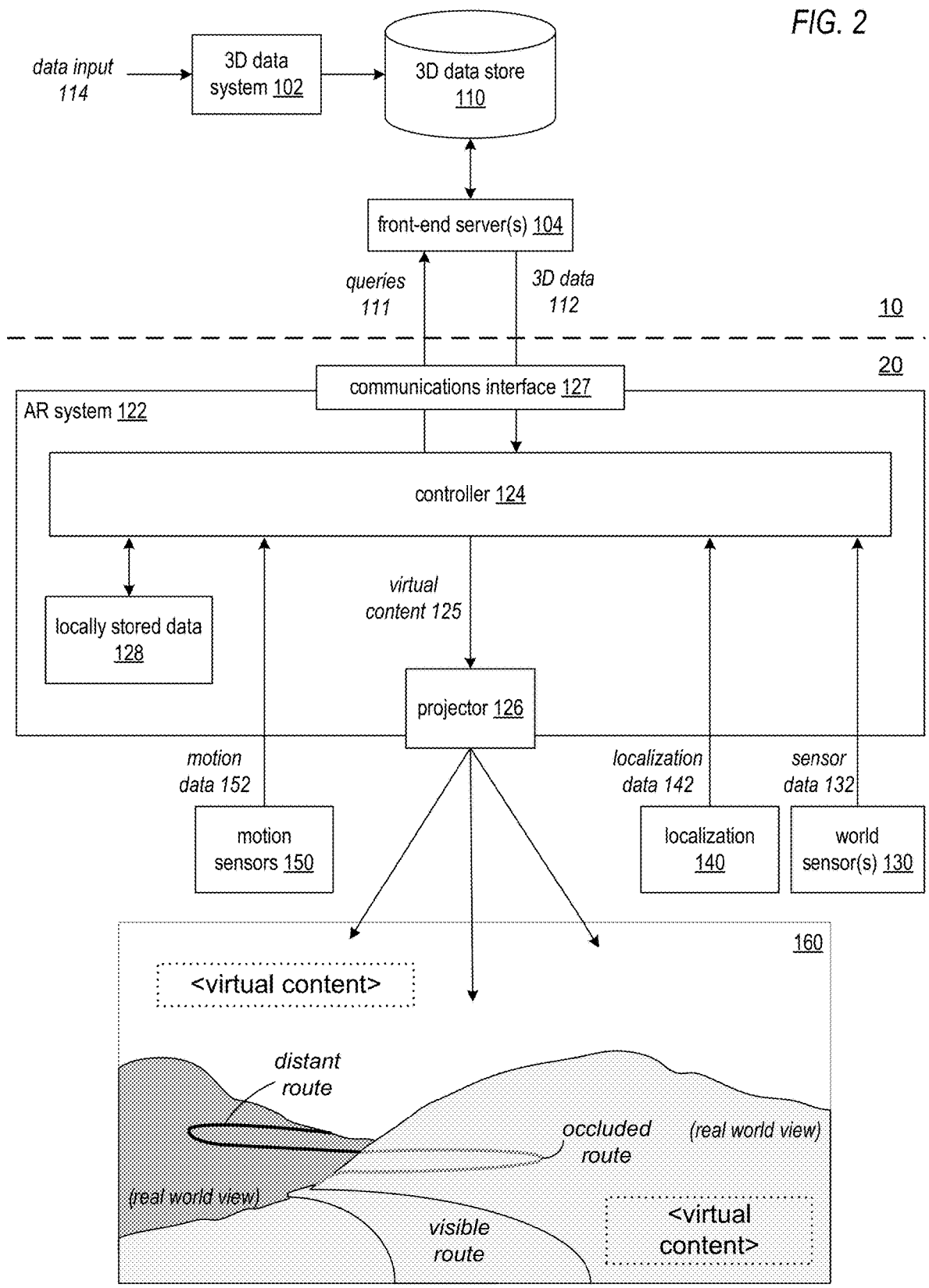
FIG. 2 illustrates an adaptive augmented reality (AR) system and display, according to some embodiments.

FIG. 2 illustrates an adaptive augmented reality (AR) system and display that may implement the various AR methods as described herien, according to some embodiments. In FIG. 2, area 20 corresponds to elements that are locally located (e.g., in a vehicle), while area 10 corresponds to elements that are remotely located (e.g., on a "cloud" network) and that may be accessed by the AR system 122 in the vehicle 20 via a wireless communications connection.

In some embodiments, the remote elements may include a 3D data system 102, 3D data store 110, and one or more front-end servers 104. Network-based 3D data system 102 may include, but is not limited to, one or more computing systems that obtain data input 114 (e.g., aerial and street photography from previous collections, images captured by vehicles equipped with instances of an AR system 122 and/or video or still cameras, images captured by personal devices such as smartphones or tablets, etc.), stereographically reconstruct and otherwise process the data input 114 to generate data including 3D mesh maps of surfaces and objects, surface normals, textures, and other geometry information, location information (e.g., GPS coordinates), elevation information, time stamps, and so on. The 3D data may be stored, for example as 3D tiles each representing a 3D portion of the real world and tagged with appropriate information, to a backend 3D data store 110, for example cloud-based storage. Frontend server(s) 104 may provide APIs for retrieving 3D data from the 3D data store 110.

In some embodiments, the vehicle 20 may include, but is not limited to, an AR system 122, world sensors 130 (e.g., LiDAR sensors, cameras, etc.), localization 140 components (e.g., a GPS or other location tracking systems, compasses, etc.), and motion sensors 150 (e.g., accelerometers, active suspension sensors, etc.). The vehicle 20 also includes at least one display 160, which may be a surface (e.g., the windshield) or screen (e.g., dash-mounted display) to which virtual content generated by the AR system 122 may be projected or otherwise displayed.

In some embodiments, the AR system 122 may include, but is not limited to, a controller 124, a communications interface 127 for querying 111 front-end server(s) 114 to obtain 3D data 112, a memory for storing 3D data and other information, and a projector 126 for projecting virtual content 125 to display 160.

In some embodiments, controller 124 may include, but is not limited to, one or more of various types of processors, CPUs, image signal processors (ISPs), graphics processing units (GPUs), coder/decoders (codecs), memory, and/or other components. The controller 502 may, for example, generate virtual content 125 for projection by the projector 126 to a display 160 based at least in part on sensor data 132 augmented by 3D data 112 obtained from the 3D data store 110 and/or from locally stored data 128 according to localization data 142 as described herein. In some embodiments, controller 124 may also obtain and use motion data 152 to affect generation and projection of virtual content 125.

Communications interface 127 may be implemented according to any suitable remote wireless communications technology. Projector 126 may be implemented according to any suitable projection technology, and may be configured to project or scan frames of virtual content 125 to display 160.

Display 160 may show a view of the real world (e.g., in front of the vehicle 20) augmented by 3D virtual content 125 generated by controller 124 and projected by projector 126 on to the real-world view. The displayed virtual content may, for example, include informational tags for objects in the view, indications of occluded features or objects such as an occluded portion of a route, indications of distant features such as a ribbon or line indicating a distant portion of the route, information about the vehicle 20 such as direction of travel, speed, etc., or in general any information that may be useful or informative for the viewer.

Figure 3:
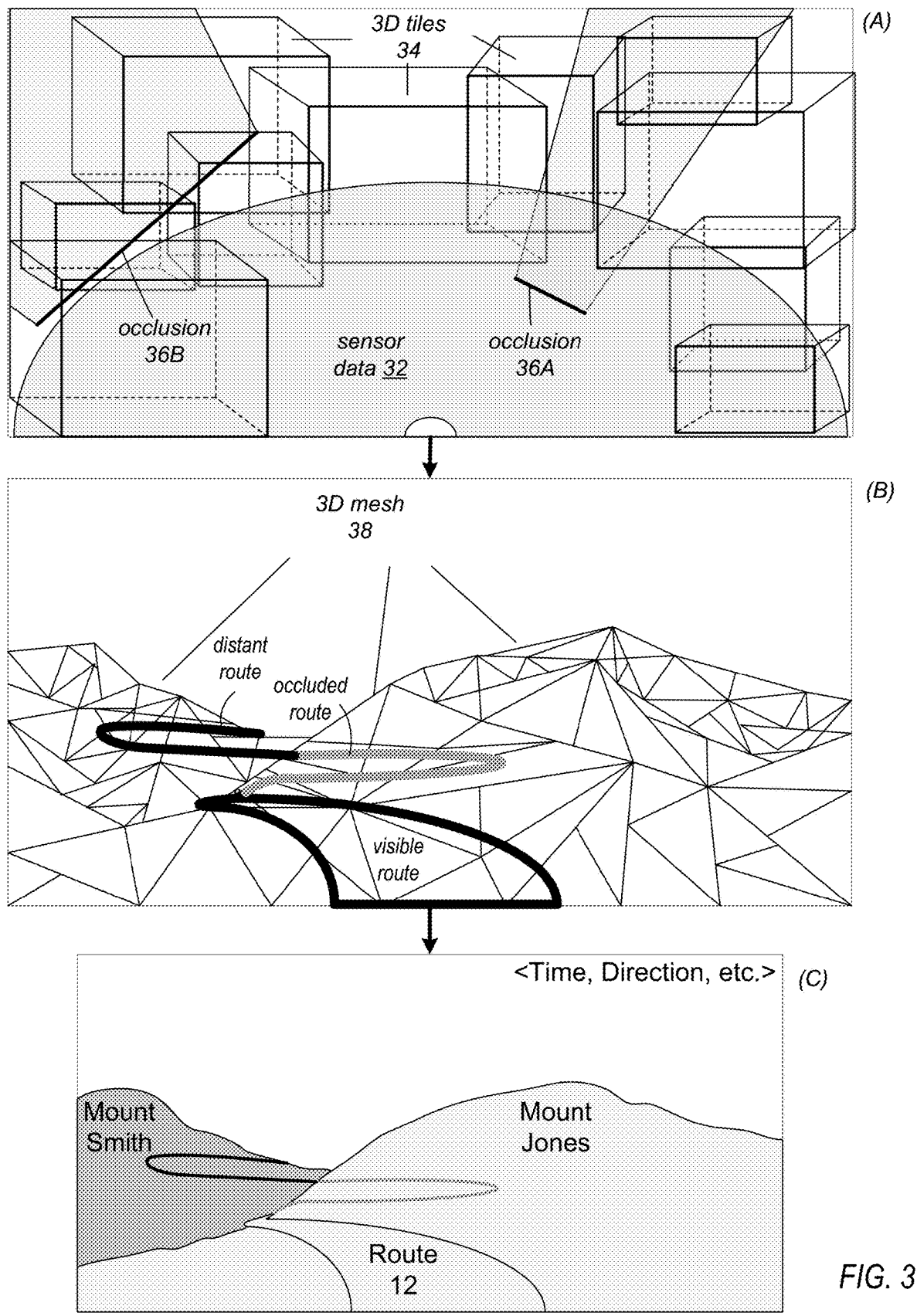
FIG. 3 illustrates processing 3D mesh map data and local sensor data to generate virtual content for an AR display, according to some embodiments.

FIG. 3 graphically illustrates processing pre-generated 3D mesh map data and local sensor data to generate virtual content for an AR display, according to some embodiments. The processing may, for example, be performed by an AR system as illustrated in FIG. 2.

FIG. 3 (A) graphically illustrates sensor data (e.g., a point cloud) 32 obtained by sensors (e.g., LiDAR) of a vehicle, and a number of example 3D tiles 34 obtained from the remote 3D data store and/or from local storage according to localization and directional information. As illustrated in FIG. 3 (A), the tiles 34 may be of different sizes, and may overlap other tiles 34. Sensor data 32 may include a point cloud including a large number of data points indicating depth, direction, elevation, and possibly other information (e.g., lighting) at points on surfaces in the scene in front of or around the vehicle as detected by the sensors. However, sensor data 32 may be limited by the effective range of the sensors, by the vehicle's velocity, or by other factors such as weather conditions and occlusions 36. In some embodiments, 3D mesh map data provided by 3D tiles 34 may be used to fill in 3D data for parts of the scene that are out of range, occluded, or for which sensor data 32 is insufficient or missing for other reasons (e.g. weather conditions). In some embodiments, the 3D mesh map data provided by 3D tiles 34 may also be used to speed up queries of the sensor data 32 for nearby objects; the required number of queries to the point cloud to generate a local map or 3D mesh of the environment within the range of the sensors may be significantly reduced based on the 3D mesh map data.

FIG. 3 (B) graphically illustrates a 3D mesh 38 generated by aligning and combining 3D mesh map data provided by 3D tiles 34 with a local 3D mesh generated from sensor data 32. In some embodiments, each point in the mesh 38 may correspond to a 3D point in the scene, may be represented by 3D coordinates, and may also have other information associated with it such as depth or distance, texture, color, visible/occluded, etc. In some embodiments occluded points or surfaces in the 3D mesh 38 may be detected by an image processing technique, for example a ray tracing technique that fires rays into the scene from the viewer's perspective; if a ray strikes at least one intervening point or surface as defined by the 3D mesh before striking another point or surface, then that other point or surface may be marked as occluded. FIG. 3 (B) also graphically illustrates locating example 3D virtual content indicating a route of the vehicle according to the 3D mesh. As shown, 3D virtual content indicating a visible portion of the route (which may be within the range of the vehicle's sensors) may be generated according to the mesh 38. In addition, 3D virtual content indicating an occluded portion of the route (and thus not detectable by the vehicle's sensors) may be generated according to the mesh 38. In addition, 3D virtual content indicating a distant portion of the route (and thus out of the range of the vehicle's sensors) may be generated according to the mesh 38; note that at least a portion of the distant route may also be occluded (e.g., by trees or terrain) and thus not visible in the real-world view on the AR display.

FIG. 3 (C) graphically illustrates virtual content generated according to the 3D mesh projected onto a real-world scene, for example onto the windshield of the vehicle. The display may show a view of the real world (e.g., in front of the vehicle) augmented by the 3D virtual content generated by the AR system and projected by the AR system on to the real-world view. The displayed virtual content may, for example, include informational tags for objects in the view (e.g., labels identifying the route as "Route 12", and labels indicating terrain or other features such as "Mount Jones" and "Mount Smit", indications of occluded features or objects such as an occluded portion of the route, indications of distant features such as a ribbon or line indicating a distant portion of the route, information about the vehicle such as direction of travel, speed, time, etc., or in general any information that may be useful or informative for the viewer.

Figure 4:
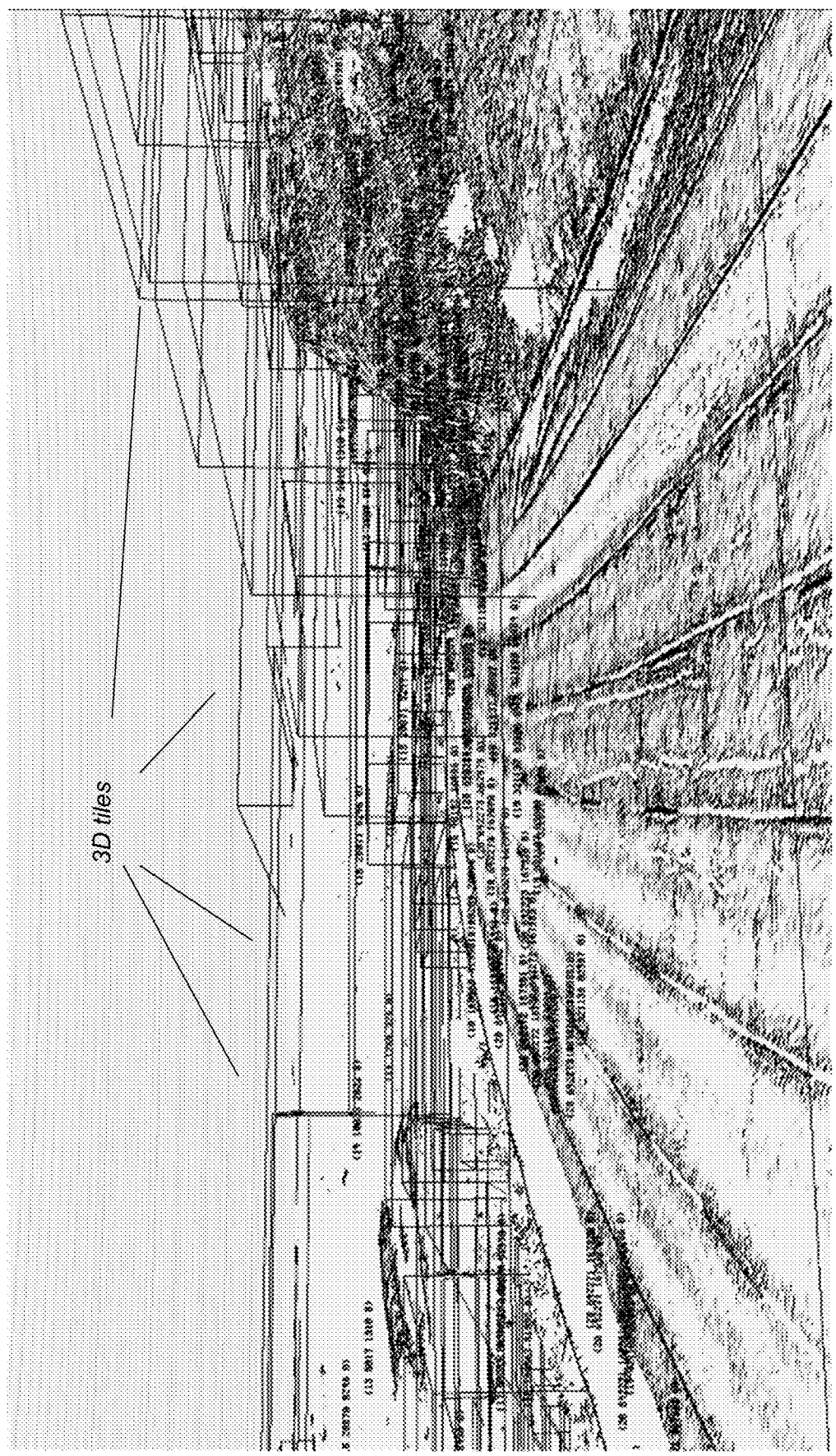
FIG. 4 illustrates 3D tiles, according to some embodiments.
Figure 5:
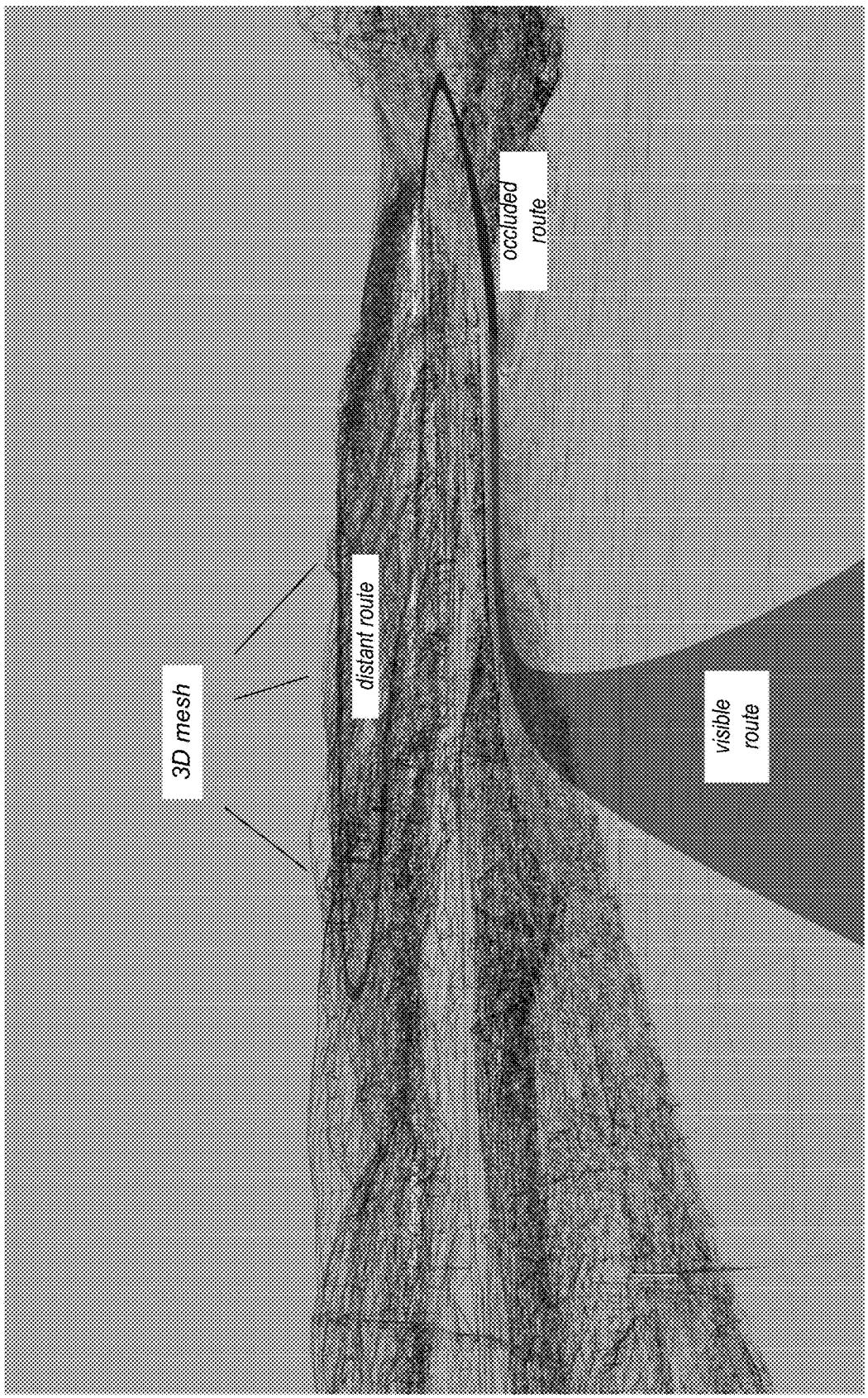
FIG. 5 illustrates a 3D mesh, according to some embodiments.
Figure 6:
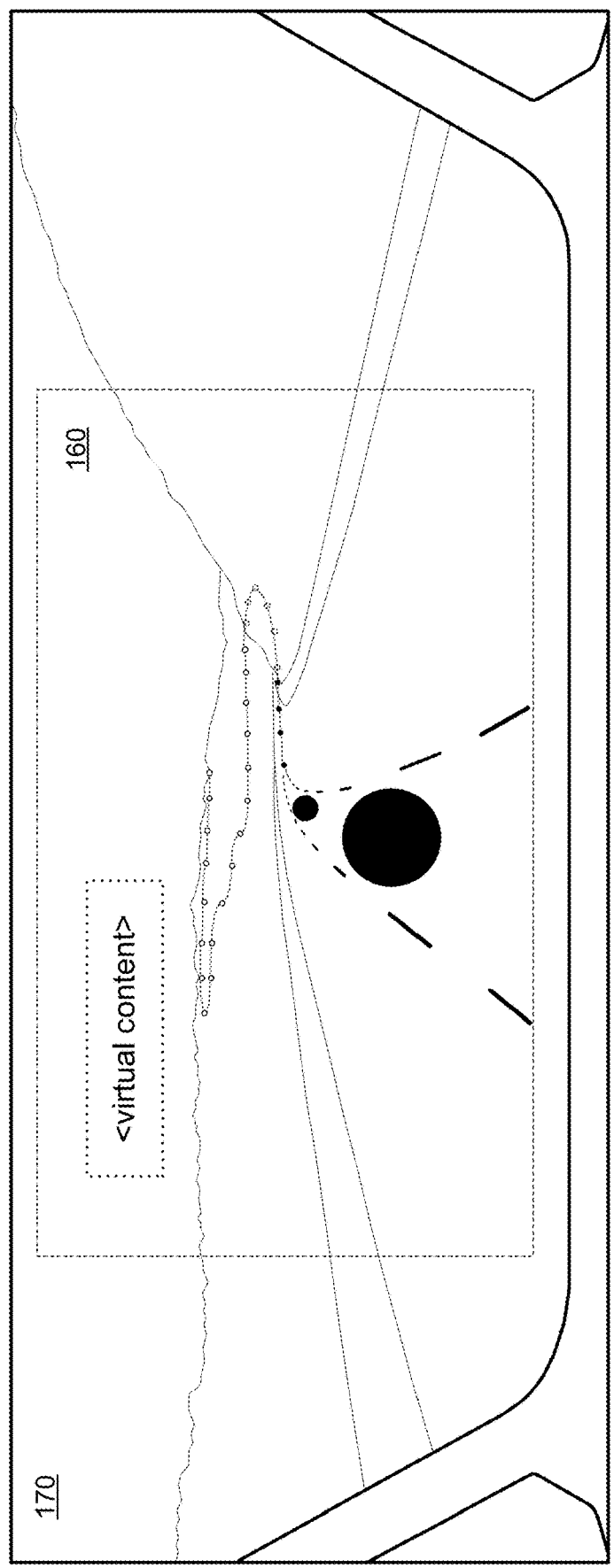
FIG. 6 illustrates an example adaptive AR display, according to some embodiments.

FIGS. 4, 5, and 6 visually illustrate processing pre-generated 3D mesh map data and local sensor data to generate virtual content for an AR display, according to some embodiments. The processing may, for example, be performed by an AR system as illustrated in FIG. 2. FIGS. 4, 5, and 6 relate to a real-world example of a scene (shown in FIG. 6) as viewed through the windshield of a vehicle.

FIG. 4 illustrates 3D tiles, for example as shown and described in reference to FIG. 3 (A), overlaid on a real-world image, according to some embodiments. As shown in FIG. 4, a large number of 3D tiles 34, which may be of different sizes and which may overlap other tiles, may be obtained from the remote 3D data store and/or from local storage according to localization and directional information of the vehicle; the 3D tiles may be used to augment or fill in the vehicle's sensor data, and/or to optimize queries to the point cloud of data collected by the sensors.

FIG. 5 illustrates a 3D mesh, for example as shown and described in reference to FIG. 3 (B), corresponding to a real-world view as shown in FIG. 6, according to some embodiments. FIG. 5 shows that the mesh may be very complex in practice. FIG. 5 also shows virtual content (a route ribbon) overlaid on the mesh that includes a nearby, visible portion, and\ occluded portion, and a distant portion. Each portion may be represented by different colors, patterns, or graphical markers. For example, occluded portions and distant portions of a route may be indicated by different colors of ribbons than used to indicate a close, visible portion of the route.

FIG. 6 illustrates an example adaptive AR display, according to some embodiments. FIG. 6 shows virtual content generated according to the 3D mesh of FIG. 5 projected onto a real-world scene, for example onto a region 160 of the windshield of the vehicle. The viewer may see the real world (e.g., in front of the vehicle through the windshield) augmented by the 3D virtual content generated by the AR system and projected by the AR system on to the real-world view. The displayed virtual content may, for example, include informational tags for objects in the view, indications of occluded features or objects such as a ribbon or colored circles indicating an occluded portion of the route, indications of distant features such as a ribbon or colored circles indicating a distant portion of the route, indications of nearby, visible features such as a portion of the route directly in front of the vehicle indicated by circles or a ribbon, information about the vehicle such as direction of travel, speed, time, etc., or in general any information that may be useful or informative for the viewer.

Figure 7:
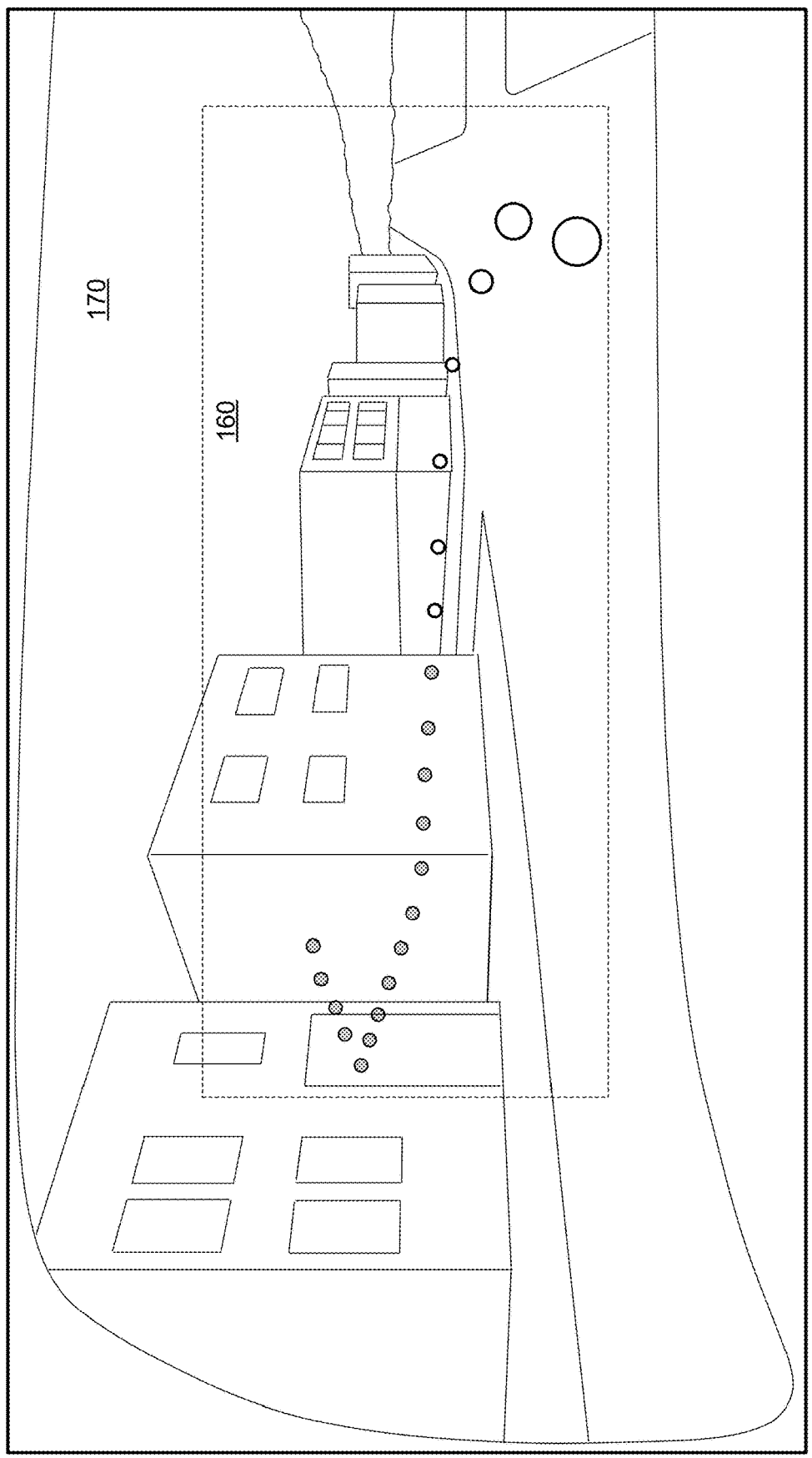
FIG. 7 illustrates another example adaptive AR display, according to some embodiments.

FIG. 7 illustrates another example of an adaptive AR display, according to some embodiments. In this example, the circles indicate a suggested route that the viewer may want to take, and the gray circles indicate a portion of the route that is occluded by real-world features such as buildings. Note that, in addition to direction, the graphical indications of the occluded route may also indicate other information to the viewer such as elevation changes, turns, surface conditions (speed bumps, construction, etc.), or in general any information about the route that may be of interest or use to the viewer. This example shows the route making a left turn in front of the vehicle, climbing a slight hill, and making a right turn.

Figure 8:
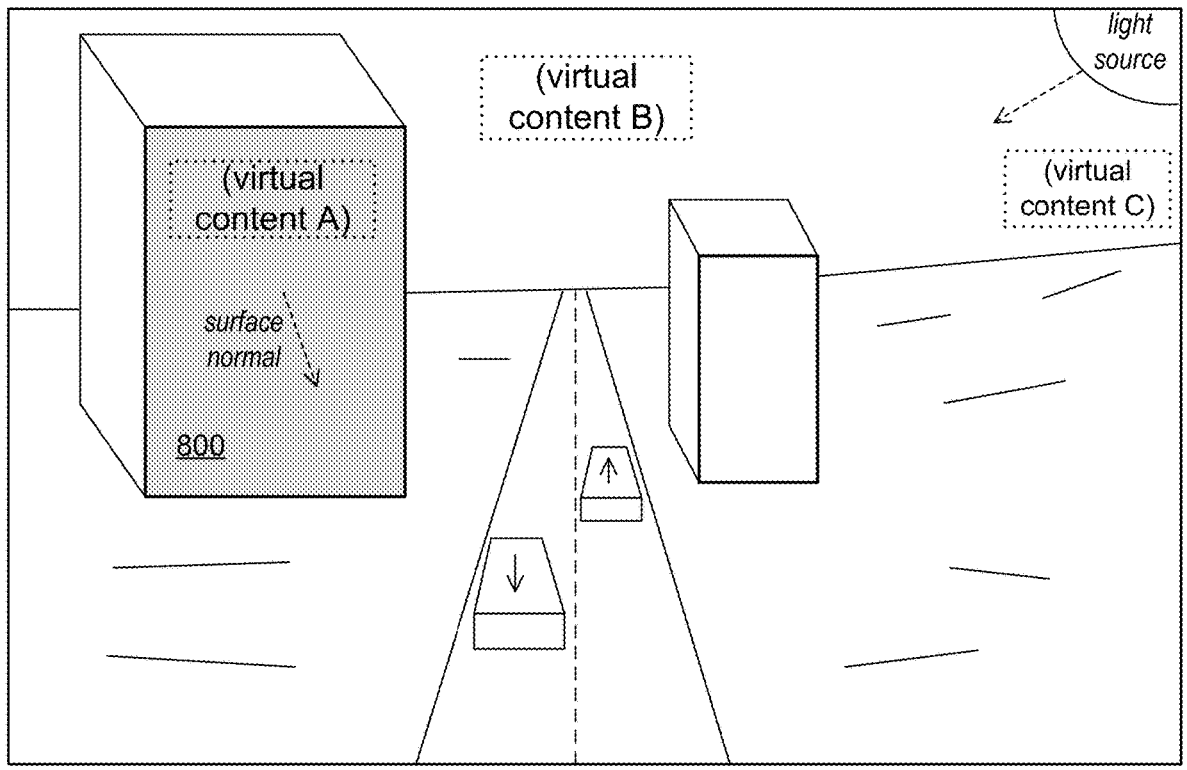
FIG. 8 illustrates adapting virtual content in an AR display according to the real world scene, according to some embodiments.

FIG. 8 graphically illustrates adapting virtual content in an AR display according to the real world scene, according to some embodiments. In some embodiments, surface normals, texture information, and/or color for objects or surfaces in the environment included in the pre-computed 3D data may be used in combination with lighting information for the environment (e.g., the current location of the sun relative to the vehicle) to relocate, change color and/or intensity of, or otherwise alter at least a portion of the 3D graphics. For example, in FIG. 8, texture information for surface 800 may indicate that the surface is highly reflective (e.g., glass). The normal for the surface 800, location of the light source (sun), and current position and direction of the vehicle may be used to determine if light from the sun would be reflecting off the surface 800 into the viewer's eyes, thus causing glare. If so, virtual content A may be moved to another location, and/or its rendering (color, intensity, size, etc.) may be modified, so that the content is more visible to the viewer. In some embodiment, colors and/or brightness of regions in the environment may be detected according to the pre-generated 3D data and/or information collected from vehicle sensors and used to relocate and/or change color of 3D graphics content. For example, in FIG. 8, if virtual content B is blue, and is to be projected onto a region of blue sky, the color of the content may be changed to provide contrast, or the content may be moved to another region. In some embodiments, position of a light source (e.g., the sun) in the view may be determined, for example by using the time of day, day of the year, and location and direction of the vehicle, or by using information collected from light sensors or cameras. This position information may be used to relocate or change the appearance of virtual content. For example, in FIG. 8, the position of the sun may be determined, and virtual content C may be moved or modified so that the content is not near or at the location of the sun.

Figure 9:
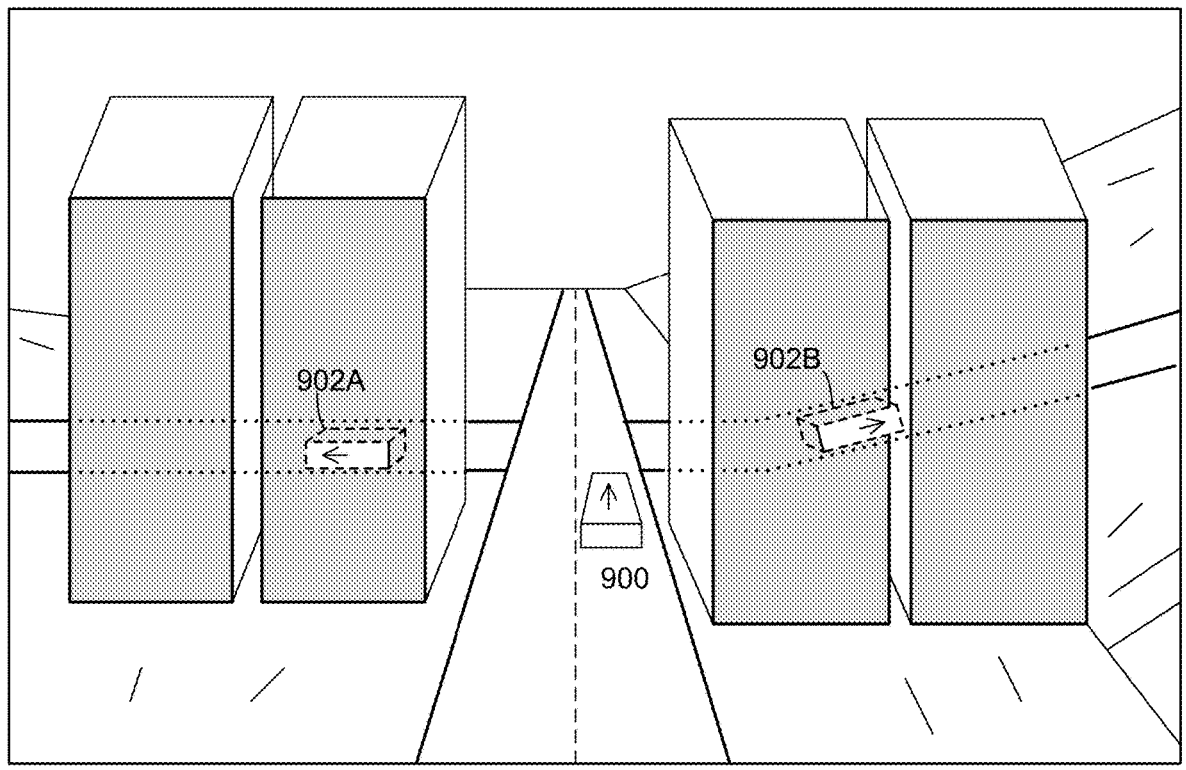
FIG. 9 illustrates displaying virtual content for animated elements in an AR display, according to some embodiments.

FIG. 9 graphically illustrates displaying virtual content for animated elements in an AR display, according to some embodiments. In some embodiments, if a visible object in the view (e.g., vehicle 900) goes behind an occluding object (e.g., a building, or a hill), an animated virtual element 902 such as graphical representations of a vehicle or pedestrian may be rendered and shown to be moving behind the object in the AR view. In some embodiments, terrain geometry (e.g. slopes of occluded roads) determined from the pre-generated 3D data may be used to alter the rendering of animated elements 902 that have gone behind buildings or terrain features so that the animated elements 902 follow the contours (e.g., slope) of the occluded terrain features. For example, in FIG. 9, animated element 902A is shown as proceeding left on a substantially flat road behind the buildings on the left, while animated element 902B is shown as proceeding right on an inclining road going up a hill behind the buildings on the right.

Figure 10:
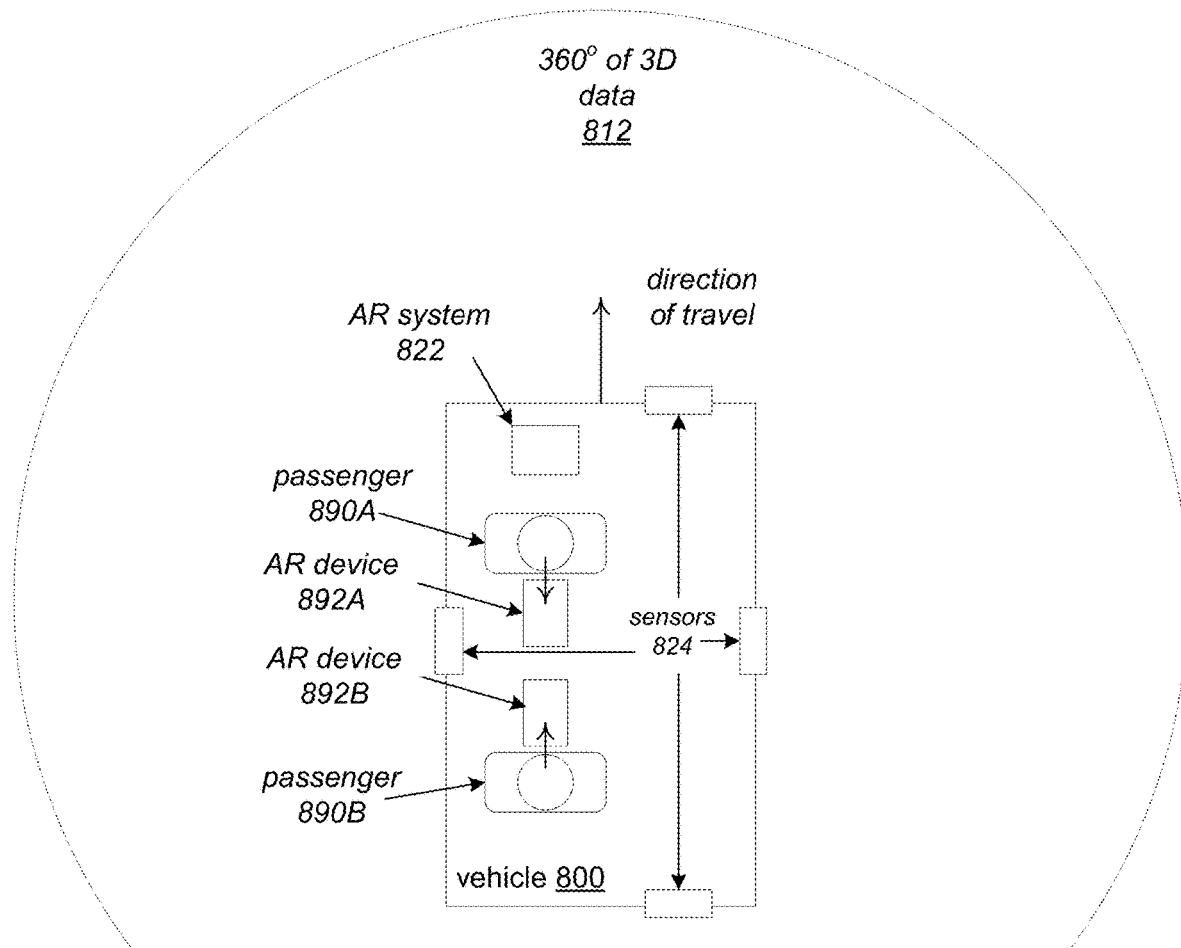
FIG. 10 illustrates leveraging 3D mesh map data and local sensor data to provide AR views of the environment to passengers in a vehicle, according to some embodiments.

FIG. 10 graphically illustrates leveraging 3D mesh map data and local sensor data to provide AR views of the environment to passengers in a vehicle, according to some embodiments. As shown in FIG. 10, the pre-generated 3D data 812 may be available for the entire real environment, 360° around the vehicle 800, behind occlusions, and beyond the horizon. Thus, in some embodiments, the 3D data 812 be leveraged to provide information about the environment, including objects that are not visible, to the sides and behind the vehicle 800.

While embodiments are generally described as projecting virtual content on to the windshield of a vehicle 800 to provide an AR view of the scene in front of the vehicle 800, in some embodiments an AR system 822 may generate 3D graphics content for views in other directions (to the sides, or to the rear) based at least in part on the pre-generated 3D data 812 and vehicle sensor 824 data, and may project the generated content to other surfaces in the vehicle (e.g., side or rear windows of the vehicle) or may provide the generated 3D graphics content to other devices that support AR displays, for example smartphones, laptop or notebook computers, or pad/tablet devices held by passengers 890, display screens mounted in the vehicle (e.g., behind the front seat or in the dashboard), or head-mounted AR displays (e.g., AR glasses, goggles, helmets, etc.) worn by passengers 890 in the vehicle. On these other devices, the 3D graphics content provided by the AR system may, for example, be overlaid on camera views of the environment obtained from vehicle-mounted cameras. FIG. 10 shows an example in which two passengers 890A and 890B are facing each other; thus, passenger 890A is facing backwards in the vehicle 800. Both passengers are holding or wearing AR-capable devices 892. AR system 822 may provide AR views to the passengers 890 via wired or wireless (e.g., Bluetooth) connections to the respective devices 892. As an example, passenger 890A, facing backwards, may want to view the scene in front of the vehicle 800, and thus AR system 822 may provide an AR view to the front to passenger 890A via device 892A. In some embodiments, a passenger 890 may point their respective device 892 in a direction to obtain an AR view in that direction, or may select a view direction via an interface. In some embodiments, at least some of the virtual content may be interactive; for example, a passenger 890 may select a virtual element to obtain more information about a visible or occluded object or terrain feature in the AR view. In some embodiments, the AR system 822 may include projectors for other windows (e.g., side windows) of the vehicle 800, and a passenger 890 may thus view an AR-enhanced view of the scene out of the other windows.

Figure 11:
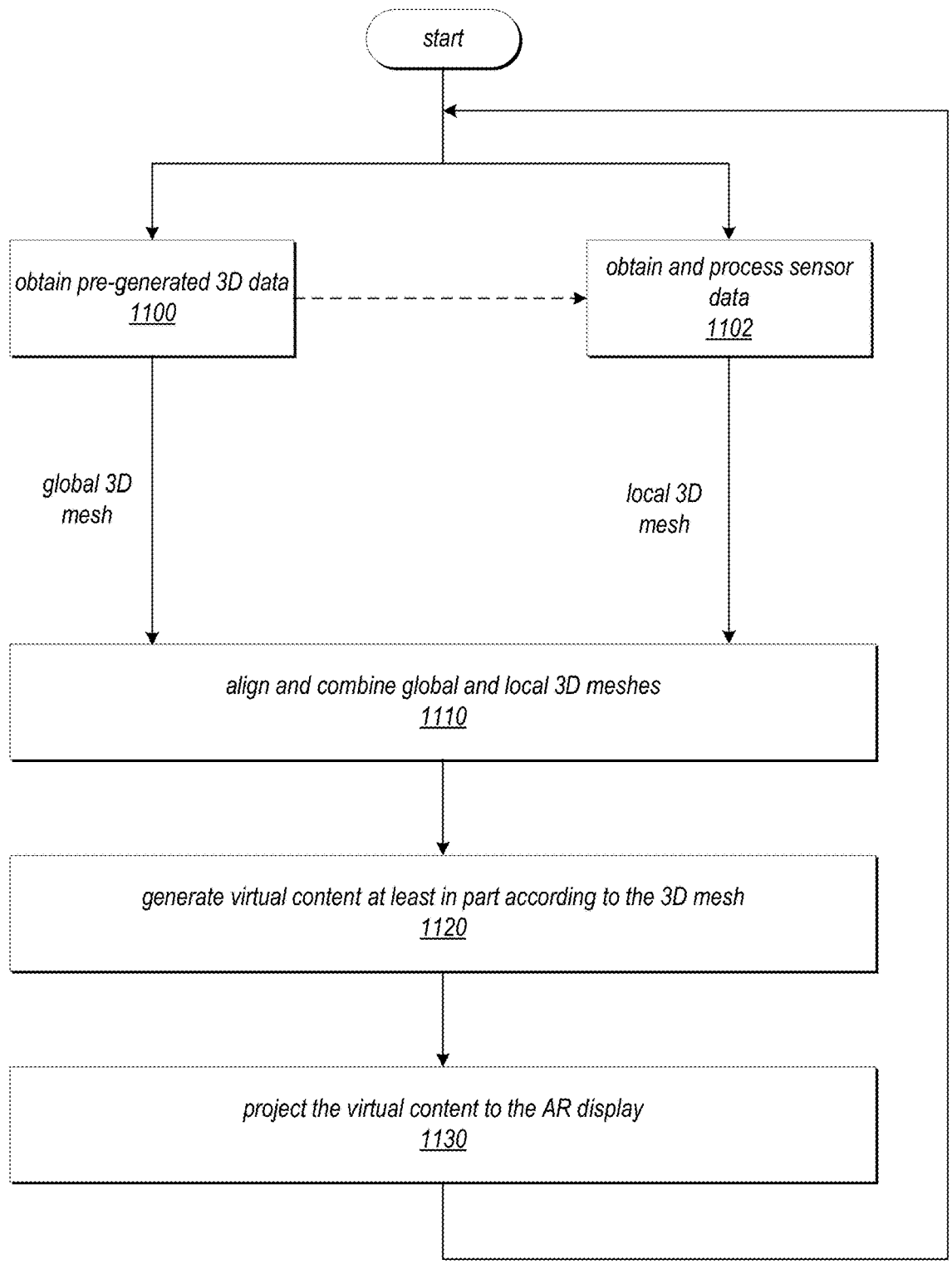
FIG. 11 is a high-level flowchart of a method for adapting an AR display using 3D mesh map data, according to some embodiments.
Figure 12:
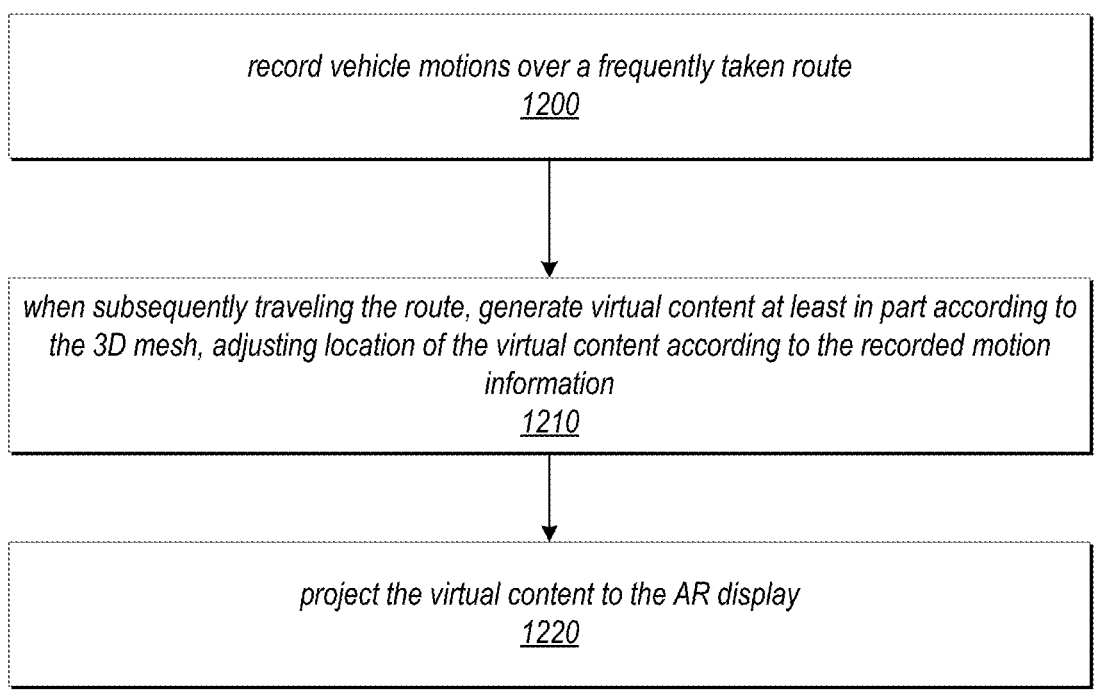
FIG. 12 is a flowchart of a method for stabilizing virtual content on an AR display, according to some embodiments.

FIG. 11 is a high-level flowchart of a method for adapting an AR display using pre-generated 3D mesh map data, according to some embodiments. As indicated at 1100, an AR system may obtain pre-generated 3D data (e.g., 3D tiles), for example from a cloud-based 3D data store as illustrated in FIG. 2. The 3D tiles together may form a global 3D mesh or 3D model of the scene, including distant (out of sensor range) and occluded portions of the scene. As indicated at 1102, the AR system may also obtain and process sensor data collected by the vehicle's sensors (e.g., LiDAR) to generate a 3D mesh or 3D model of the local (within the range of the sensors) environment. As shown by the arrow from 1100 to 1102, the pre-generated 3D data may be used to reduce or optimize queries of the sensor data to thus speed up processing of the sensor data. As indicated at 1110, the global 3D mesh and the local 3D mesh may be aligned and combined by the AR system to generate a 3D mesh or 3D model of the scene that may extend from just outside the vehicle to the horizon or beyond; the 3D mesh includes nearby, distant, and occluded areas of the scene. As indicated at 1120, the AR system may then generate virtual content at least in part according to the 3D mesh as described herein. As indicated at 1130, the AR system may then project the virtual content to the AR display (e.g., to the windshield of the vehicle). As shown by the arrow returning from element 1130, the method may be a continuous process to update the virtual content projected to the AR display Stabilizing Virtual Content FIG. 12 is a flowchart of a method for stabilizing virtual content on an AR display, according to some embodiments. A driver of a vehicle may frequently travel the same route, for example a route to and from work. A variable in the environment is surface conditions of the roads that the driver takes. As indicated at 1200, vehicle motions (e.g., bouncing) may be recorded over a frequently traveled route. As shown in FIG. 2, the vehicle may include motion sensors (e.g., accelerometers, active suspension sensors, etc.) that may provide motion information to the AR system. In some embodiments, the AR system may record this motion information, either in local storage or by providing the information to the 3D data system for recording in the 3D data store (e.g., cloud-based storage). As indicated at 1210, when subsequently traveling the route, the AR system may generate virtual content to be displayed at least in part according to the 3D mesh as previously described. In some embodiments, the recorded vehicle motion information may be used to adjust location of the virtual content according to the recorded motion information for the route. For example, if the recorded motion information indicates a bump at a given location, the virtual content may be moved up or down according to the recorded motion of the vehicle so that the virtual content is stabilized in the driver's view. As indicated at 1230, the stabilized virtual content may be projected to the AR display.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

The following clauses include examples of embodiments of the systems and methods discussed above.

Clause 1. A system, comprising:
a projector; and
a controller configured to:
 obtain pre-generated 3D data for at least part of a real-world scene, wherein the pre-generated 3D data includes pre-generated 3D meshes for respective regions of the scene;
 determine one or more of the pre-generated 3D meshes that include portions of a local region that is within range of one or more sensors;
 use point cloud data obtained from the one or more sensors to generate a local 3D mesh for portions of the local region that are not included in the pre-generated 3D meshes; and generate a 3D model of the scene using the local 3D mesh and the pre-generated 3D meshes.

Clause 2. The system as recited in clause 1, wherein the point cloud data comprises a plurality of data points, wherein each data point indicates depth, direction, and elevation of a point on a surface within the local region as detected by the one or more sensors.

Clause 3. The system as recited in clause 1, wherein the pre-generated 3D meshes include portions of the scene that are out of range of the sensors and portions of the scene that are occluded by objects or terrain in the scene.

Clause 4. The system as recited in clause 1, wherein the one or more pre-generated 3D meshes include portions of the scene within the range of the one or more sensors that are occluded by objects or terrain within the range of the one or more sensors.

Clause 5. The system as recited in clause 1, wherein, to generate the local 3D mesh, the controller is configured to query the point cloud to obtain data points for the portions of the local region that are not included in the one or more pre-generated 3D meshes, wherein queries are not performed for the portions of the local region that are included in the one or more pre-generated 3D meshes.

Clause 6. The system as recited in clause 1, wherein the controller is further configured to:
render virtual content for the scene at least in part according to the 3D model; and
provide the rendered virtual content to the projector for projection to a display, wherein the projected virtual content provides an augmented view of the scene to a viewer.

Clause 7. The system as recited in clause 6, wherein the pre-generated 3D data includes surface normals for one or more surfaces in the scene, and wherein, to render virtual content for the scene at least in part according to the 3D model, the controller is configured to:
determine direction of light from a light source in the scene;
determine from the direction of the light and the surface normal of a surface that the surface reflects the light in the direction of the viewer; and
move a portion of the virtual content that is intended to be displayed on or near the surface to another location in the scene.

Clause 8. The system as recited in clause 6, wherein the pre-generated 3D data includes information for one or more surfaces in the scene including surface normals, texture, and color, and wherein, to render virtual content for the scene at least in part according to the 3D model, the controller is configured to modify rendering or location of portions of the virtual content according to the surface information.

Clause 9. The system as recited in clause 6, wherein the virtual content includes one or more of indications of features in the scene that are within range of the sensors, indications of features in the scene that are out of range of the sensors, or indications of features in the scene that are occluded by objects or terrain in the scene.

Clause 10. The system as recited in clause 6, wherein the display is incorporated into a windshield of a vehicle.

Clause 11. The system as recited in clause 10, wherein the virtual content includes one or more of an indication of a portion of a route that is within range of the sensors, an indication of a portion of the route that is out of range of the sensors, or an indication of a portion of the route that is occluded by objects or terrain features in the scene.

Clause 12. The system as recited in clause 10, wherein the virtual content includes a graphical representation of a moving object that is occluded by an object or terrain feature in the scene, wherein the controller is configured to render the graphical representation of the moving object so that the moving object responds to contours of terrain geometry determined from the pre-generated 3D data.

Clause 13. The system as recited in clause 10, wherein the controller is configured to:
record motion of the vehicle due to surface conditions on a frequently traveled route; and
adjust location of the virtual content on the display according to the recorded motion of the vehicle on the route.

Clause 14. A method, comprising:
obtaining, by an augmented reality (AR) system in a vehicle, pre-generated 3D data for at least part of an environment outside the vehicle, wherein the pre-generated 3D data includes pre-generated 3D meshes for respective regions of the environment;
determining, by the AR system, one or more of the pre-generated 3D meshes that include portions of a local region that is within range of one or more sensors on the vehicle;
generating, by the AR system, a local 3D mesh for portions of the local region that are not included in the pre-generated 3D meshes using point cloud data obtained from the one or more sensors; and
generating, by the AR system, a 3D model of the environment using the local 3D mesh and the pre-generated 3D meshes.

Clause 15. The method as recited in clause 14, wherein the point cloud data comprises a plurality of data points, wherein each data point indicates depth, direction, and elevation of a point on a surface within the local region as detected by the one or more sensors.

Clause 16. The method as recited in clause 14, wherein the 3D model includes portions of the environment that are out of range of the sensors and portions of the environment that are occluded by objects or terrain in the environment.

Clause 17. The method as recited in clause 14, wherein generating the local 3D mesh comprises querying the point cloud to obtain data points for the portions of the local region that are not included in the one or more pre-generated 3D meshes, wherein queries are not performed for the portions of the local region that are included in the one or more pre-generated 3D meshes.

Clause 18. The method as recited in clause 14, further comprising:
rendering, by the AR system, virtual content at least in part according to the 3D model; and
projecting, by the AR system, the rendered virtual content to a window of the vehicle, wherein the projected virtual content provides an augmented view of the environment to a viewer.

Clause 19. The method as recited in clause 18, wherein rendering virtual content comprises:
determining from direction of light in the environment and a surface normal of a surface in the 3D model that the surface reflects the light in the direction of the viewer; and
moving a portion of the virtual content that is intended to be displayed on or near the surface to another location in the window.

Clause 20. The method as recited in clause 18, wherein the 3D model includes information for one or more surfaces in the scene including surface normals, texture, and color, and wherein the method further comprises modifying the rendering or location of portions of the virtual content according to the surface information.

Clause 21. The method as recited in clause 18, wherein the virtual content includes one or more of indications of features that are within range of the sensors, indications of features that are out of range of the sensors, or indications of features that are occluded by objects or terrain in the scene.

Clause 22. The method as recited in clause 18, wherein the virtual content includes one or more of an indication of a portion of a route that is within range of the sensors, an indication of a portion of the route that is out of range of the sensors, or an indication of a portion of the route that is occluded by objects or terrain features in the scene.

Clause 23. The method as recited in clause 18, wherein the virtual content includes a graphical representation of a moving object that is occluded by an object or terrain feature, wherein method further comprises rendering the graphical representation of the moving object so that the moving object responds to contours of terrain geometry.

Clause 24. The method as recited in clause 18, further comprising:
recording motion of the vehicle due to surface conditions on a frequently traveled route; and
adjusting location of the virtual content on the window according to the recorded motion of the vehicle on the route.

What is claimed is:
1. A system, comprising:
a display device; and
a controller comprising:
one or more processors; and
a memory storing instructions that, when executed on or across the one or more processors, cause the one or more processors to:
obtain sensor data for an environment of a real-world scene captured by one or more sensors;
generate virtual content for the environment based at least on the sensor data and three-dimensional (3D) mesh data for the environment;
determine lighting information for a region of the environment on which the virtual content is to be projected, the lighting information indicating a location or orientation of a light source relative to one or more surfaces of the region of the environment;

modify an appearance of the virtual content based at least on the determined lighting information of the region by moving a portion of the virtual content that is to be projected on or near the surface to another location; and provide the virtual content to the display device.

2. The system of claim 1, wherein the memory further comprises instructions that, when executed on or across the one or more processors, cause the one or more processors to:

determine a surface normal of a surface within the region of the environment;

determine a direction of light from the light source; and determine that the surface reflects the light in the direction of a viewer based at least on the direction of the light and the surface normal.

3. The system of claim 2, wherein the 3D mesh data comprises information indicating the surface normal.

4. The system of claim 2, wherein to determine that the surface reflects the light in the direction of the viewer, the memory further comprises instructions that, when executed on or across the one or more processors, cause the one or more processors to:

determine a current position and direction of a vehicle comprising the display device and the controller.

5. The system of claim 1, wherein the memory further comprises instructions that, when executed on or across the one or more processors, cause the one or more processors to:

modify the appearance of the virtual content by changing an intensity or a size of the virtual content based, at least in part, on the determined lighting information of the region.

6. The system of claim 1, wherein the instructions, when executed on or across the one or more processors, cause the one or more processors to:

determine one or more colors of the region of the environment on which the virtual content is to be projected wherein the modification of the appearance of the virtual content is further based on the determined one or more colors of the region on which the virtual content is to be projected.

7. The system of claim 1, wherein the display device is incorporated into a windshield of a vehicle.

8. A method, comprising:

performing, with one or more computing devices:

obtaining sensor data for an environment of a real-world scene captured by one or more sensors;

generating virtual content for the environment based at least on the sensor data and three-dimensional (3D) mesh data for the environment;

determining lighting information for a region of the environment on which the virtual content is to be projected, the lighting information indicating a location or orientation of a light source relative to one or more surfaces of the region of the environment;

modifying an appearance of the virtual content based at least on the determined lighting information of the region by moving a portion of the virtual content that is to be projected on or near the surface to another location; and providing the virtual content to a display device.

9. The method of claim 8, further comprising:

determining a surface normal of a surface within the region of the environment;

determining a direction of light from the light source; and determining that the surface reflects the light in the direction of a viewer based at least on the direction of the light and the surface normal.

10. The method of claim 9, wherein the 3D mesh data comprises information indicating the surface normal.

11. The method of claim 9, wherein determining that the surface reflects the light in the direction of the viewer comprises:

determining a current position and direction of a vehicle comprising the display device and the controller.

12. The method of claim 8, wherein modifying the appearance of the virtual content comprises:

modifying an intensity or a size of the virtual content based, at least in part, on the determined lighting information of the region.

13. The method of claim 8, wherein modifying the appearance of the virtual content comprises:

modifying the appearance of the virtual content based, at least in part, on one or more colors of the region determined according to the sensor data.

14. The method of claim 8, wherein the display device is incorporated into a windshield of a vehicle.

15. One or more non-transitory, computer-readable storage media storing instructions that, when executed on or across one or more processors, cause the one or more processors to:

obtain sensor data for an environment of a real-world scene captured by one or more sensors;

generate virtual content for the environment based at least on the sensor data and three-dimensional (3D) mesh data for the environment;

determine lighting information indicating for a region of the environment on which the virtual content is to be projected, the lighting information a location or orientation of a light source relative to one or more surfaces of the region of the environment;

modify an appearance of the virtual content based at least on the determined lighting information of the region by moving a portion of the virtual content that is to be projected on or near the surface to another location; and provide the virtual content to a display device.

16. The one or more non-transitory, computer-readable storage media of claim 15, wherein the memory further comprises instructions that, when executed on or across the one or more processors, cause the one or more processors to:

determine a surface normal of a surface within the region of the environment;

determine a direction of light from the light source;

determine that the surface reflects the light in the direction of a viewer based at least on the direction of the light and the surface normal.

17. The one or more non-transitory, computer-readable storage media of claim 16, wherein the 3D mesh data comprises information indicating the surface normal.

18. The one or more non-transitory, computer-readable storage media of claim 17, wherein to determine that the surface reflects the light in the direction of the viewer, the memory further comprises instructions that, when executed on or across the one or more processors, cause the one or more processors to:

determine a current position and direction of a vehicle comprising the display device and the controller.

19. The one or more non-transitory, computer-readable storage media of claim 15, wherein to modify the appearance of the virtual content the instructions, when executed on or across the one or more processors, cause the one or more processors to:

modify an intensity or a size of the virtual content based, at least in part, on the determined lighting information of the region.

20. The one or more non-transitory, computer-readable storage media of claim 15, wherein to modify the appearance of the virtual content the instructions, when executed on or across the one or more process, cause the one or more processors to:
  modify the appearance of the virtual content based, at least in part, on one or more colors of the region determined according to the sensor data.

\* \* \* \* \*